US010612746B2

United States Patent
Johnson et al.

(10) Patent No.: US 10,612,746 B2
(45) Date of Patent: *Apr. 7, 2020

(54) VEHICULAR LIGHTING ASSEMBLIES AND HEADLAMPS WITH CONDENSER LENSES CONFIGURED TO PREVENT SOLAR DAMAGE

(71) Applicant: Ford Global Technologies, LLC, Dearborn, MI (US)

(72) Inventors: Aaron Bradley Johnson, Allen Park, MI (US); John Matthew Teodecki, Grosse Pointe Farms, MI (US); Stuart C. Salter, White Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,071

(22) Filed: Mar. 6, 2019

(65) Prior Publication Data

US 2019/0203906 A1  Jul. 4, 2019

Related U.S. Application Data

(63) Continuation of application No. 15/588,013, filed on May 5, 2017, now Pat. No. 10,267,482.

(51) Int. Cl.
*F21S 45/10* (2018.01)
*F21S 41/20* (2018.01)
(Continued)

(52) U.S. Cl.
CPC ............ *F21S 45/10* (2018.01); *B60Q 1/0011* (2013.01); *B60Q 1/04* (2013.01); *F21S 41/255* (2018.01);
(Continued)

(58) Field of Classification Search
CPC ........ F21S 45/10; F21S 41/275; F21S 41/285; F21S 45/02; F21S 45/08; F21V 3/04;
(Continued)

(56) References Cited

U.S. PATENT DOCUMENTS

| 2,798,147 A | 7/1957 | Orsatti |
| 2,907,249 A | 10/1959 | Hjermstad |

(Continued)

FOREIGN PATENT DOCUMENTS

| CN | 2352399 Y | 12/1999 |
| CN | 102261618 A | 11/2011 |

(Continued)

OTHER PUBLICATIONS

Guang-Shun Yi and Gan-Moog Chow, Colloidal LaF3:Yb,Er, LaF3:Yb,Ho and LaF3:Yb,Tm nanocrystals with multicolor upconversion fluorescence, Sep. 7, 2005, Journal of Materials Chemistry, 4460-4464. (Year: 2005).*

*Primary Examiner* — Bryon T Gyllstrom
*Assistant Examiner* — Colin J Cattanach
(74) *Attorney, Agent, or Firm* — David Coppiellie; Price Heneveld LLP

(57) ABSTRACT

A vehicular lighting assembly (and methods of making the same) that includes a parabolic reflector; a condenser lens comprising a non-planar rear surface; an outer lens; a bezel between the lenses; and a light source that emanates light that strikes the reflector and exits the assembly through the condenser lens and the outer lens. Further, the non-planar rear surface of the condenser lens refracts ambient light entering the condenser lens away from the bezel. In embodiments, the non-planar rear surface can comprise a convex or a concave surface.

20 Claims, 9 Drawing Sheets

(51) Int. Cl.
  *F21S 41/32* (2018.01)
  *F21S 41/255* (2018.01)
  *F21S 41/275* (2018.01)
  *B60Q 1/00* (2006.01)
  *B60Q 1/04* (2006.01)
  *F21S 41/50* (2018.01)
  *F21V 5/10* (2018.01)
  *F21K 9/64* (2016.01)
  *F21V 3/08* (2018.01)
  *F21V 9/30* (2018.01)
  *F21V 3/12* (2018.01)

(52) U.S. Cl.
  CPC ........... *F21S 41/275* (2018.01); *F21S 41/285* (2018.01); *F21S 41/32* (2018.01); *F21K 9/64* (2016.08); *F21S 41/321* (2018.01); *F21S 41/50* (2018.01); *F21V 3/08* (2018.02); *F21V 3/12* (2018.02); *F21V 5/10* (2018.02); *F21V 9/30* (2018.02)

(58) Field of Classification Search
  CPC ..... F21V 3/10; F21V 3/12; F21V 5/10; F21V 5/08; F21V 5/02; F21V 3/08; F21V 9/30; F21K 9/64
  See application file for complete search history.

(56) References Cited

U.S. PATENT DOCUMENTS

| | | | |
|---|---|---|---|
| 3,743,385 A | 7/1973 | Schaefer | |
| 5,383,102 A * | 1/1995 | Jones | F21S 41/337 362/510 |
| 6,000,814 A * | 12/1999 | Nestell | F21S 45/10 362/267 |
| 6,352,359 B1 | 3/2002 | Shie et al. | |
| 6,469,622 B1 | 10/2002 | Komatsu et al. | |
| 6,601,981 B2 | 8/2003 | Wilski | |
| 2001/0010632 A1 | 8/2001 | Futami | |
| 2003/0189838 A1 | 10/2003 | Schottland et al. | |
| 2004/0095779 A1 * | 5/2004 | Schottland | F21V 3/04 362/510 |
| 2004/0125613 A1 | 7/2004 | Hasegawa et al. | |
| 2005/0207164 A1 | 9/2005 | Holtz et al. | |
| 2009/0065583 A1 | 3/2009 | McGrew | |
| 2010/0277939 A1 * | 11/2010 | Komatsu | F21V 9/04 362/516 |
| 2011/0029194 A1 | 2/2011 | Brown et al. | |
| 2015/0070933 A1 * | 3/2015 | van den Bogerd | F21V 5/04 362/611 |
| 2015/0330592 A1 | 11/2015 | Olson | |
| 2016/0017218 A1 | 1/2016 | Kojima et al. | |
| 2016/0026005 A1 | 1/2016 | Flinders | |
| 2016/0033104 A1 * | 2/2016 | Larsen | F21S 41/255 362/520 |
| 2016/0075823 A1 * | 3/2016 | Imazato | C08G 64/0208 528/370 |
| 2017/0144589 A1 | 5/2017 | Jung et al. | |
| 2017/0211774 A1 | 7/2017 | Harrington, Jr. | |
| 2017/0241612 A1 | 8/2017 | Puente et al. | |
| 2017/0241613 A1 | 8/2017 | Faoucher et al. | |
| 2017/0321866 A1 * | 11/2017 | Asami | C09K 11/02 |
| 2017/0363787 A1 | 12/2017 | Acheff | |
| 2018/0029529 A1 | 2/2018 | Iseki et al. | |
| 2019/0004217 A1 * | 1/2019 | Couillard | H01L 33/58 |

FOREIGN PATENT DOCUMENTS

| | | |
|---|---|---|
| DE | 29912504 U1 | 9/1999 |
| DE | 202012005548 U1 | 7/2012 |
| FR | 2981429 A1 | 4/2013 |
| JP | H04357602 A | 12/1992 |
| JP | 2009199778 A | 9/2009 |
| JP | 2013168218 A | 8/2013 |
| JP | 2014063604 A | 4/2014 |
| KR | 20120029883 A | 3/2012 |
| KR | 20120055030 A | 5/2012 |
| KR | 20120110595 A | 10/2012 |
| KR | 20130071151 A | 6/2013 |
| KR | 20130141211 A | 12/2013 |
| WO | 2013161352 A1 | 10/2013 |

* cited by examiner

VEHICULAR LIGHTING ASSEMBLIES AND HEADLAMPS WITH CONDENSER LENSES CONFIGURED TO PREVENT SOLAR DAMAGE

CROSS REFERENCE TO RELATED APPLICATIONS

This application is a continuation application that claims priority to and the benefit under 35 U.S.C. § 120 of U.S. patent application Ser. No. 15/588,013 filed on May 5, 2017, entitled "VEHICULAR LIGHTING ASSEMBLIES AND HEADLAMPS WITH CONDENSER LENSES CONFIGURED TO PREVENT SOLAR DAMAGE," the entire disclosure of which is incorporated by reference herein.

FIELD OF THE INVENTION

The present invention generally relates to vehicular lighting assemblies, particularly headlamp assemblies with condenser lenses that are configured to minimize or otherwise avoid damage to bezels and fascia elements from refraction and reflection of ambient light.

BACKGROUND OF THE INVENTION

As more efficient lighting source technologies (e.g., light emitting diode (LED) technologies) and vehicular designs with large sweep and/or rake angles are being incorporated into vehicular lighting assembly designs, damage-related problems associated with ambient light can develop. These new lighting assembly designs can be susceptible to bezel and/or fascia damage from refraction and reflection of sunlight that enters these lighting assemblies. More particularly, sunlight rays, depending on the angle of the sun relative to the vehicle, can enter the outer lens, refract through the front surface of the condenser lens, reflect off a back surface of the condenser lens, and then exit the condenser and main outer lens at an orientation that strikes the bezel and/or fascia associated with the lighting assembly. As these bezel and fascia are often made from various polymers that are susceptible to focused thermal energy, the bezels and fascia can degrade, discolor or even ash from such refracted and reflected sunlight.

Modern vehicle headlamps often incorporate lines, stripes and patterns known to those in the field as optical flutes on portions of the lens. These fluted lines, stripes and patterns on the lens of headlamps and other vehicular lighting assemblies can be configured to change the direction of incoming sunlight to prevent solar light damage to vehicular lighting components, such as bezels and fascia, in proximity to them. As used in conventional headlamp designs, the flutes can be configured to be relatively small in size and can successfully eliminate or reduce the likelihood of such solar-related damage. Nevertheless, these optical flutes and other similar patterned portions on the lens surfaces of headlamps of vehicles, particularly luxury and high-end vehicles, are often viewed by consumers as defects or design features that otherwise detract from the craftsmanship and aesthetics of the vehicle.

Accordingly, there is a need for vehicular lighting assembly designs that are configured to minimize or otherwise avoid solar-related damage to bezels, fascia and other vehicle components in proximity to these lighting assemblies, while not detracting from the overall aesthetics of the lighting assemblies and the vehicle employing them. Further, there is a need for vehicular lighting assembly designs that avoid solar damage without detriment to the optical characteristics and/or energy usage of the designs in fulfilling their primary function(s) (e.g., production of a low-beam headlamp pattern).

SUMMARY OF THE INVENTION

According to one aspect of the present invention, a vehicular lighting assembly is provided that includes a parabolic reflector; a condenser lens comprising a non-planar rear surface; an outer lens; a bezel between the lenses; and a light source that emanates light that strikes the reflector and exits the assembly through the lenses. Further, the non-planar rear surface of the condenser lens refracts ambient light entering the condenser lens away from the bezel.

According to another aspect of the present invention, a vehicular lighting assembly is provided that includes a parabolic reflector; a condenser lens comprising a concave rear surface; an outer lens; a bezel between the lenses; and a light source that emanates light that strikes the reflector and exits the assembly through the lenses. Further, the concave rear surface of the condenser lens refracts ambient light entering the condenser lens away from the bezel.

According to a further aspect of the present invention, a vehicular lighting assembly is provided that includes a parabolic reflector; a condenser lens comprising a convex rear surface; an outer lens; a bezel between the lenses; and a light source that emanates light that strikes the reflector and exits the assembly through the lenses. Further, the convex rear surface of the condenser lens refracts ambient light entering the condenser lens away from the bezel.

According to another aspect of the present invention, a vehicular lighting assembly is provided that includes a condenser lens comprising a non-planar rear surface; an outer lens; a bezel between the lenses; and a light source that emanates light that strikes the reflector and exits the assembly through the lenses. The non-planar rear surface comprises quantum dots configured to emit light from an excitation emission in the infrared spectrum and is configured to reflect ambient light entering the condenser lens away from the bezel.

According to another aspect of the present invention, a vehicular lighting assembly is provided that includes a condenser lens comprising a non-planar rear surface; an outer lens; a bezel between the lenses; and a light source that emanates light that strikes the reflector and exits the assembly through the lenses. The non-planar rear surface comprises quantum dots having a radius of between about 1 nm and about 10 nm and reflects ambient light entering the condenser lens away from the bezel.

According to a further aspect of the present invention, a vehicular lighting assembly is provided that includes a condenser lens comprising a non-planar rear surface having a crown angle from 1 to 5 degrees; an outer lens; a bezel between the lenses; and a light source that emanates light that strikes the reflector and exits the assembly through the lenses. The non-planar rear surface comprises photoluminescent quantum dots and reflects ambient light entering the condenser lens away from the bezel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
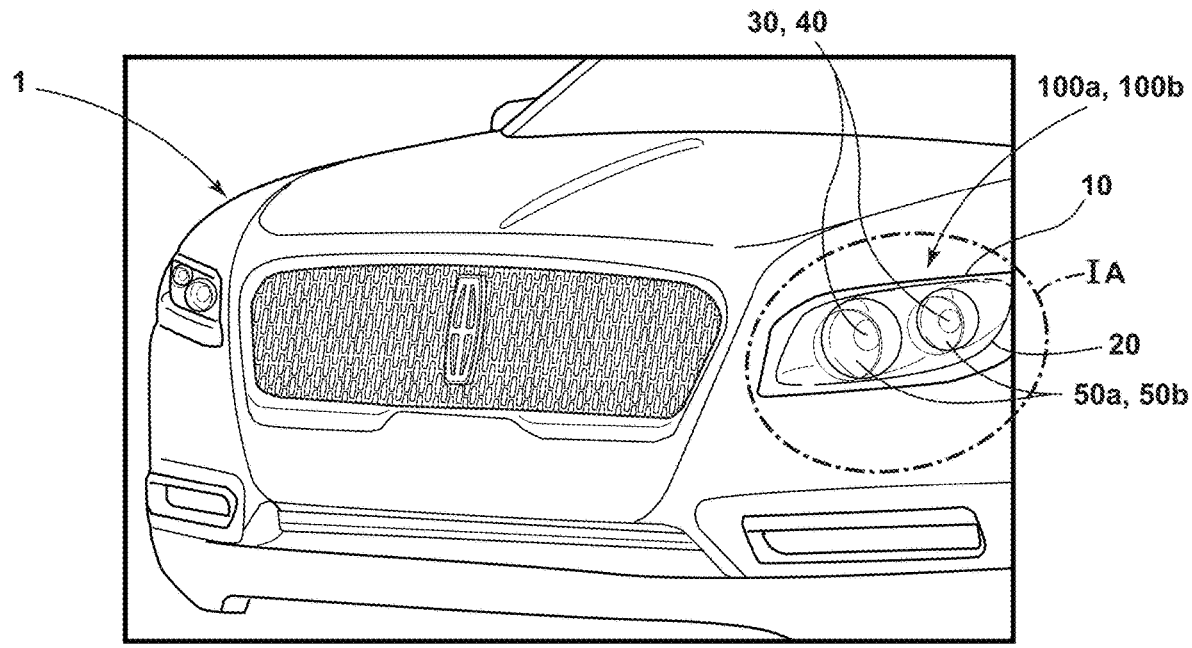
FIG. 1 is a front perspective view of a vehicle with vehicular headlamp assemblies that include condenser lenses with non-planar rear surfaces, according to an aspect of the disclosure.

For purposes of description herein, the terms "upper," "lower," "right," "left," "rear," "front," "vertical," "horizontal," "interior," "exterior," "vehicle forward," "vehicle rearward," and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Described in the disclosure are various vehicular lighting assemblies, including vehicular headlamp assemblies, with condenser lenses that are configured to minimize or otherwise avoid damage to bezels and fascia elements from refraction and reflection of ambient light. Further, these vehicular lighting assembly designs are configured to minimize or otherwise avoid solar-related damage to bezels, fascia and other vehicle components, while not detracting from the overall aesthetics of the lighting assemblies and the vehicle employing them. In addition, these vehicular lighting assembly designs can avoid solar damage without detriment to the optical characteristics and/or energy usage of the designs in fulfilling their primary function(s) (e.g., production of a low-beam headlamp pattern). As such, these vehicular lighting assemblies include but are not limited to low-beam headlamps, high-beam headlamps, turn signal assemblies and parking lamp assemblies. The "regulated, geometric visibility zones" for these types of vehicular lighting assemblies include those identified within U.S. Federal Motor Vehicle Safety Standard 108 ("FMVSS 108") and United Nations Economic Commission for Europe Regulation No. 48 ("ECE 48"), both of which are hereby incorporated by reference within this disclosure.

Figure 1A:
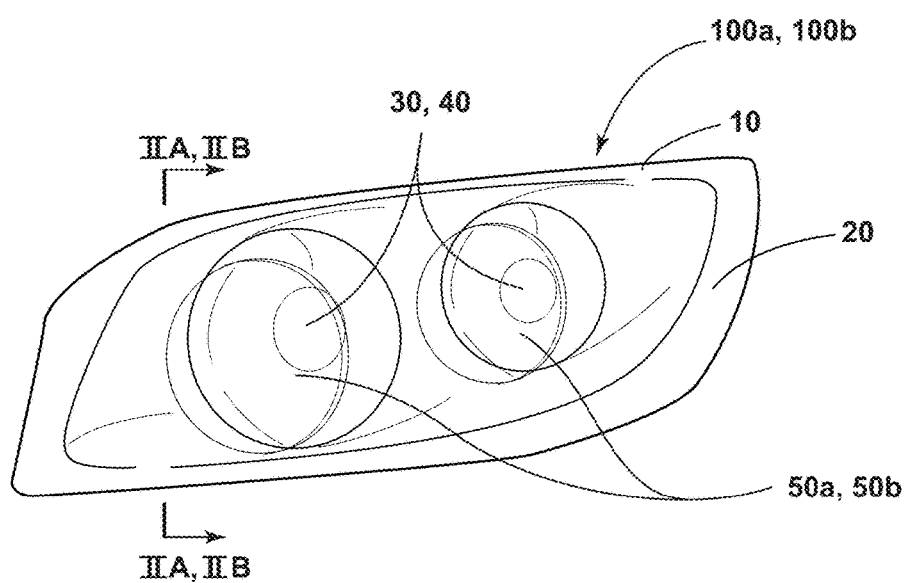
FIG. 1A is an enlarged, front perspective view of one of the vehicular headlamp assemblies depicted in FIG. 1 at region IA.

Referring to FIGS. 1 and 1A, vehicular headlamp assemblies 100a, 100b according to aspects of the disclosure are depicted on a vehicle 1 in a front, perspective view. Each of these headlamp assemblies 100a, 100b includes a condenser lens 50a, 50b and an outer lens 10. Further, a bezel 20 is located between the lenses 10 and 50a, 50b. As shown, the condenser lenses 50a, 50b are circular; nevertheless, it should be understood that the condenser lenses 50a, 50b can take on other shapes, depending on the shape and design of the headlamp assembly 100a, 100b, including square, rectangular, and elliptical shapes. As shown, each of these headlamp assemblies 100a, 100b are configured to ensure that ambient light (e.g., from the sun) that enters these assemblies through the outer lens 10 does not result in damage to the bezels 20 (i.e., as located between the lenses 10 and 50a, 50b) and other features in proximity to these assemblies, e.g., vehicle fascia elements, that are susceptible to thermal damage. In contrast, conventional vehicular headlamp assemblies (not shown in FIGS. 1, 1A) can be susceptible to such damage through ambient light that enters the assemblies, internally reflects and/or refracts within the assemblies, and then leaves the assemblies and strikes bezel, fascia and other features susceptible to thermal damage.

Referring again to FIGS. 1 and 1A, each of the vehicular headlamp assemblies 100a, 100b are affixed to the front of a vehicle 1. As depicted, each headlamp assembly 100a, 100b is configured with a parabolic reflector 30 and one or more light sources 40. Each of the light sources 40 emanates light that strikes the reflector 30 and exits the assembly 100a, 100b through the lenses 10, 50a, 50b. In aspects of the disclosure, the light sources 40 are configured within the headlamp lighting assemblies 100a, 100b to emanate light that exits the assembly through the outer lens 10, typically in a low-beam, high-beam or turn signal light pattern. In certain embodiments, the light sources 40 include light-emitting diode (LED), incandescent, halogen or other light source technologies. In certain implementations, the outer lens 10 can include one or more near-field lens (NFLs) elements, each with similar or distinct focal points. These NFLs can be configured to produce various light patterns, including those associated with vehicular low-beam, high-beam, parking and turn signal light patterns.

Figure 2A:
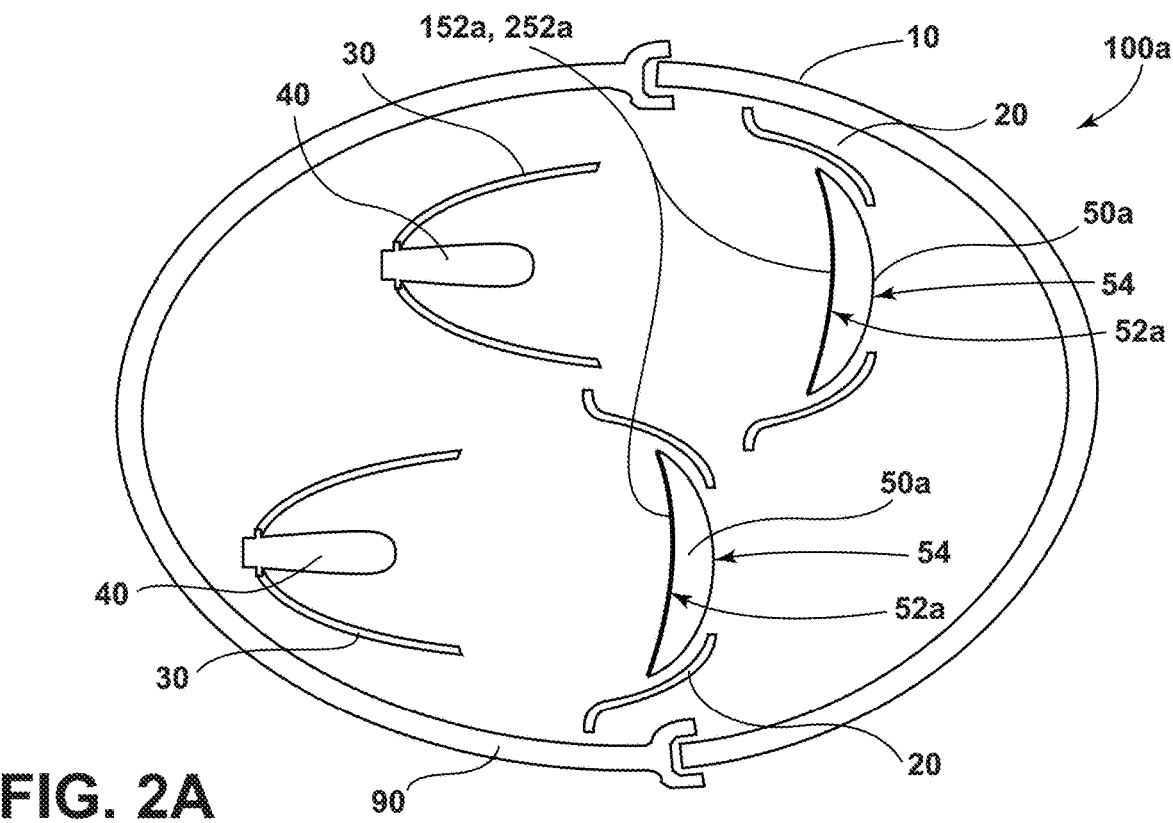
FIG. 2A is a cross-sectional, schematic view of the vehicular headlamp assembly depicted in FIG. 1A through line IIA-IIA, as including a condenser lens with a concave rear surface, according to a further aspect of the disclosure.
Figure 2B:
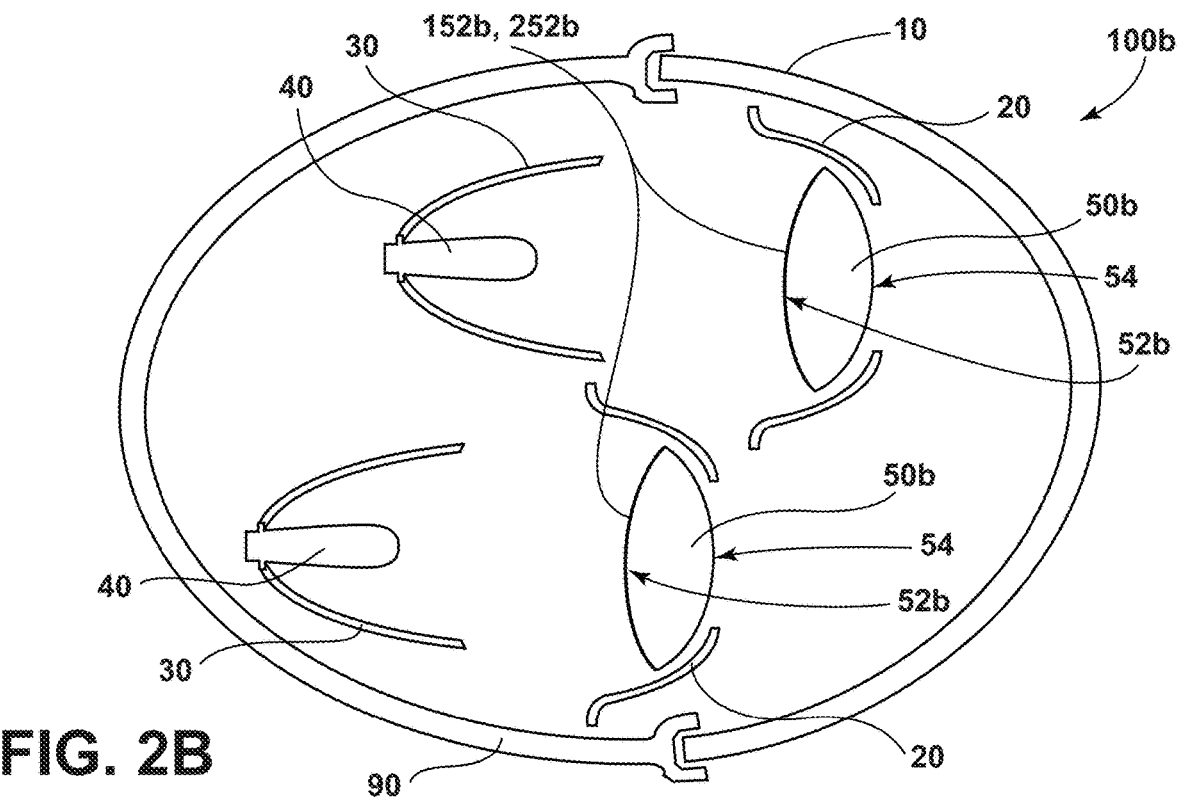
FIG. 2B is a cross-sectional, schematic view of the vehicular headlamp assembly depicted in FIG. 1A through line IIB-IIB, as including a condenser lens with a convex rear surface, according to a further aspect of the disclosure.

Referring now to FIGS. 2A and 2B, a vehicular headlamp assembly 100a, 100b is shown in a cross-sectional, schematic view. Each of the vehicular headlamp assemblies 100a, 100b includes a parabolic reflector 30 and a condenser lens 50a, 50b. The condenser lens 50a, 50b includes a non-planar rear surface 52a, 52b and a front surface 54. Further, each of the headlamp assemblies 100a, 100b includes an outer lens 10; a bezel 20 between the lenses 10, 50a, 50b; and a light source 40 that emanates light that strikes the reflector 30 and exits the assembly 100a, 100b, through the lenses 10, 50a, 50b. As depicted in exemplary form in FIGS. 2A, 2B, the outer lens 10 can be arranged within a housing 90 such that the outer lens 10 and the housing 90 contain the bezel 20, reflector 30, light source 40, and condenser lens 50a, 50b.

As also depicted in FIGS. 2A, 2B, the respective condenser lens 50a, 50b of the vehicular headlamp assemblies 100a, 100b can be configured such that its non-planar rear surface 52a, 52b refracts ambient light entering the condenser lens 50a, 50b away from the bezel 20. For example, sunlight that enters the outer lens 10 of the headlamp assemblies 100a, 100b can be refracted by the lens 10 and then enter the condenser lens 50a, 50b through its front surface 54. The light can then be refracted within the condenser lens 50a, 50b and then strike the rear, non-planar surface 52a, 52b. Rather than directly reflecting and concentrating off of that surface, the light reflects and spreads off of the rear surface 52a, 52b by virtue of its lack of planarity. The light then exits the front surface 54 of the condenser lens 50a, 50b and the outer lens 10, away from the bezel 20. Accordingly, the non-planar rear surface 52a, 52b aids in preventing sunlight from causing solar-related damage to the bezel 20 of the headlamp assemblies 100a, 100b.

Referring again to the condenser lens 50a, 50b employed in the vehicular headlamp assemblies 100a, 100b, its non-planar rear surface 52a, 52b can be defined according to a crown angle. As used herein, the "crown angle" is indicative of the non-planarity of the rear surface of the condenser lenses employed in the lighting assemblies of the disclosure, and defined as the maximum angle the surface makes relative to a hypothetical planar rear surface. In some implementations of the headlamp assemblies 100a, 100b, the non-planar rear surface 52a, 52b is characterized by a crown angle of at least 1 degree. Further, in some aspects, the non-planar surface 52a, 52b of a condenser lens 50a, 50b can also be characterized by a maximum crown angle of 5 degrees, to ensure that the collimation function of the condenser lens 50a, 50b is not significantly impacted by the non-planar nature of its rear surface. In an embodiment, the crown angle of the non-planar rear surface 52a, 52b ranges from about 1 degree to about 2 degrees, which ensures that ambient light entering the headlamp assembly 100a, 100b does not damage bezels 20, fascia, etc., while at the same time ensuring that the collimation function of the condenser lens 50a, 50b is not adversely impacted.

In some embodiments of the vehicular headlamp assemblies 100a, 100b, the condenser lens 50a, 50b is configured with a non-planar rear surface 52a, 52b that includes one or more layers of optical silicone 152a, 152b, preferably derived from a low viscosity silicone. As these silicone materials are relatively easy to mold, they afford a large degree of dimensional control over the final dimensions of the non-planar rear surface 52a, 52b. In some aspects, the one or more layers of optical silicone 152a, 152b can be applied to the condenser lens 50a, 50b to achieve the desired degree of non-planarity, e.g., by control of its crown angle. In other aspects, the one or more layers of optical silicone 152a, 152b can be applied to the condenser lens 50a, 50b to incorporate a relatively high density of micron (e.g., from about 1 microns to 50 microns) or sub-micron (e.g., from about 0.01 microns to about 1 micron) size imperfections to increase the degree of light scattering that occurs when ambient light enters the headlamp assemblies 100a, 100b and strikes the non-planar rear surface 52a, 52b.

In another embodiment of the headlamp assemblies 100a, 100b, the condenser lens 50a, 50b is configured with a non-planar rear surface 52a, 52b that incorporates a number of quantum dots 252a, 252b. As used herein, "quantum dots" are nanoscale semiconductor devices that tightly confine either electrons or electron holes in all three spatial dimensions and may be photoluminescent, as understood by those with ordinary skill in the field of this disclosure. In some embodiments of the assemblies 100a, 100b, the photoluminescence of the quantum dots employed in the non-planar rear surfaces 52a, 52b can be manipulated to absorb a significant portion of the spectrum of any ambient light that enters the assemblies, and then emit it at particular wavelengths at relatively low intensities. As such, the quantum dots 252a, 252b can serve to reduce the intensity of any ambient light that reflects and/or otherwise refracts within the headlamp assemblies 100a, 100b and then strikes the bezel 20, fascia and/or other comparable features in proximity to the assemblies 100a, 100b that are susceptible to thermal damage. In some embodiments, the photoluminescence of the quantum dots 252a, 252b can be manipulated to specific wavelengths by controlling the particle diameter of the quantum dots. Quantum dots 252a, 252b may have a radius, or a distance half of their longest length, in the range of between about 1 nm and about 10 nm, or between about 2 nm and about 6 nm. Larger quantum dots 252a, 252b (e.g., as having a radius of 5-6 nm) emit longer wavelength light resulting in the color of the light being such colors as orange or red. Smaller quantum dots 252a, 252b (e.g., as having a radius of 2-3 nm) emit shorter wavelengths resulting in colors such as blue and green. The wavelength of light emitted from the quantum dots 252a, 252b may vary depending on the exact composition of the quantum dots. Quantum dots 252a, 252b naturally produce monochromatic light. Exemplary compositions of the quantum dots 252a, 252b include $LaF_3$ quantum dot nanocrystals that are doped (e.g., coated) with Yb-Er, Yb-Ho and/or Yb-Tm. Other types of quantum dots 252a, 252b that can be used include various types of tetrapod quantum dots and perovskite enhanced quantum dots.

Referring again to condenser lenses 50a, 50b that are configured with non-planar rear surfaces 52a, 52b that include a plurality of quantum dots 252a, 252b, some embodiments employ quantum dots that are configured to emit light in response to an excitation emission. According to various embodiments, the quantum dots 252a, 252b may be configured to emit light by up-converting excitation light. Up-conversion works by absorbing two or more photons of a longer wavelength excitation emission. Once absorbed, the quantum dots 252a, 252b may emit one or more photons having a shorter wavelength than the wavelengths of the excitation emission. According to various embodiments, the excitation emission may be infrared light. In such embodiments, the excitation emission may have a wavelength of between about 800 nm and about 1000 nm, which can also serve to minimize the effects of any such light that exits the headlamp assemblies 100a, 100b and strikes the bezel 20, fascia and/or other features in proximity to these assemblies that are susceptible to thermal damage.

The materials and compositions employed for the outer lens 10 and the condenser lens 50a, 50b can include various materials, and blends of materials, including polycarbonate and silicone, which are typically employed in automotive headlamp lens elements. In some embodiments, the materials employed in the lenses 10, 50a, 50b can possess a relatively low viscosity such that they can flow into features of a mold configured to create their various surfaces designed to ensure that the headlamp assemblies 100a, 100b achieve their particular optical function, e.g., production of low-beam and high-beam headlamp patterns. Further, low viscosity materials capable of flow within a mold are preferred in the formation of the non-planar rear surface 52a, 52b of the condenser lens 50a, 50b to achieve the desired non-planarity to reduce or eliminate solar-related damage while not significantly detracting from the overall optical performance of the headlamp assemblies 100a, 100b. To that end, materials are preferably selected for the condenser lens 50a, 50b that can be readily processed with or joined to optical grade silicone, e.g., particularly to the extent that silicone is employed in the fabrication of the non-planar rear surface 52a, 52b of the condenser lens 50a, 50b.

The construction and materials for the parabolic reflector 30 of the headlamp assemblies 100a, 100b depicted in FIGS. 2A, 2B are not particularly limiting in certain aspects of the disclosure; consequently, conventional constructions of this feature can be employed in the headlamp assembly 100a, 100b in many implementations. In embodiments of the headlamp assembly 100a, 100b, the parabolic reflector 30 can be configured with interior surfaces (i.e., those facing the light source 40) having a high specular reflectivity. Such surfaces in these embodiments are mirror-like surfaces and, in some embodiments, include one or more metal-containing films, layers or other comparable structures. Further, certain implementations of the headlamp assembly 100a, 100b can employ an asymmetric parabolic reflector 30 with one or more non-parabolic or asymmetric regions. In particular, these regions of the parabolic reflector 30 can be configured to further ensure that some reflected light from the incident light that originates from the light sources 40 is directed away from primary portions of the light pattern produced by the assembly. Accordingly, the parabolic reflector 30, in some embodiments of the headlamp assemblies 100a, 100b, can also play a role in establishing other portions of the light pattern produced by the assemblies, e.g., to aid in peripheral lighting outside of the primary portion of a particular headlamp pattern.

Referring again to FIGS. 2A and 2B, the outer lens 10 and condenser lens 50a, 50b of the headlamp assembly 100a, 100b can be configured with a substantial degree of translucency. In some aspects, the outer lens 10 and/or the condenser lens 50a, 50b is characterized by an optical transmissivity of 85% or more over the visible spectrum (e.g., 390 nm to 700 nm). Preferably, the outer lens 10 and the condenser lens 50a, 50b are each characterized by an optical transmissivity of 90% or more, and even more preferably, 95% or more, over the visible spectrum. Further, the outer lens 10 and the condenser lens 50a, 50b can be optically clear with no substantial coloration. In other embodiments, the outer lens 10 can be tinted or affixed with one or more filters on its interior surfaces and/or exterior surfaces to obtain a desired hue (e.g., blue, red, green, etc.).

Now referring to FIG. 2A, a vehicular headlamp assembly 100a is shown in a cross-sectional, schematic view. The vehicular headlamp assembly 100a includes a parabolic reflector 30 and a condenser lens 50a. As shown in FIG. 2A, the condenser lens 50a includes a non-planar rear surface 52a defined by a concave shape, and a front surface 54. Further, each of the headlamp assemblies 100a includes an outer lens 10; a bezel 20 between the lenses 10, 50a; and a light source 40 that emanates light that strikes the reflector 30 and exits the assembly 100a through the lenses 10, 50a.

As also depicted in FIG. 2A, the condenser lens 50a of the vehicular headlamp assemblies 100a can be configured such that the concave shape of the non-planar rear surface 52a refracts ambient light entering the condenser lens 50a away from the bezel 20. For example, sunlight that enters the outer lens 10 of the headlamp assemblies 100a can be refracted by the lens 10 and then enter the condenser lens 50a through its front surface 54. The light can then be refracted within the condenser lens 50a and then strike the non-planar rear surface 52a with a concave shape. Rather than directly reflecting and concentrating off of that surface, the light reflects and spreads off of the non-planar rear surface 52a by virtue of its concavity in a direction away from the central axis of the condenser lens 50a. The light then exits the front surface 54 of the condenser lens 50a and the outer lens 10, away from the bezel 20. Accordingly, the non-planar rear surface 52a, as configured with a concave shape, aids in preventing sunlight from causing solar-related damage to the bezel 20 of the headlamp assemblies 100a.

Referring now to FIG. 2B, a vehicular headlamp assembly 100b is shown in a cross-sectional, schematic view. The vehicular headlamp assembly 100b includes a parabolic reflector 30 and a condenser lens 50b. As shown in FIG. 2B, the condenser lens 50b includes a non-planar rear surface 52b defined by a convex shape, and a front surface 54. Further, each of the headlamp assemblies 100b includes an outer lens 10; a bezel 20 between the lenses 10, 50b; and a light source 40 that emanates light that strikes the reflector 30 and exits the assembly 100b through the lenses 10, 50b.

As also depicted in FIG. 2B, the condenser lens 50b of the vehicular headlamp assemblies 100b can be configured such that the convex shape of the non-planar rear surface 52b refracts ambient light entering the condenser lens 50b away from the bezel 20. For example, sunlight that enters the outer lens 10 of the headlamp assemblies 100b can be refracted by the lens 10 and then enter the condenser lens 50b through its front surface 54. The light can then be refracted within the condenser lens 50b and then strike the non-planar rear surface 52b with a convex shape. Rather than directly reflecting and concentrating off of that surface, the light reflects and spreads off of the non-planar rear surface 52b by virtue of its convex shape in a directions that cross the central axis of the condenser lens 50b and then spread away from it. The light then exits the front surface 54 of the condenser lens 50b and the outer lens 10, away from the bezel 20. Accordingly, the non-planar rear surface 52b, as configured with a convex shape, aids in preventing sunlight from causing solar-related damage to the bezel 20 of the headlamp assemblies 100b.

Figure 3:
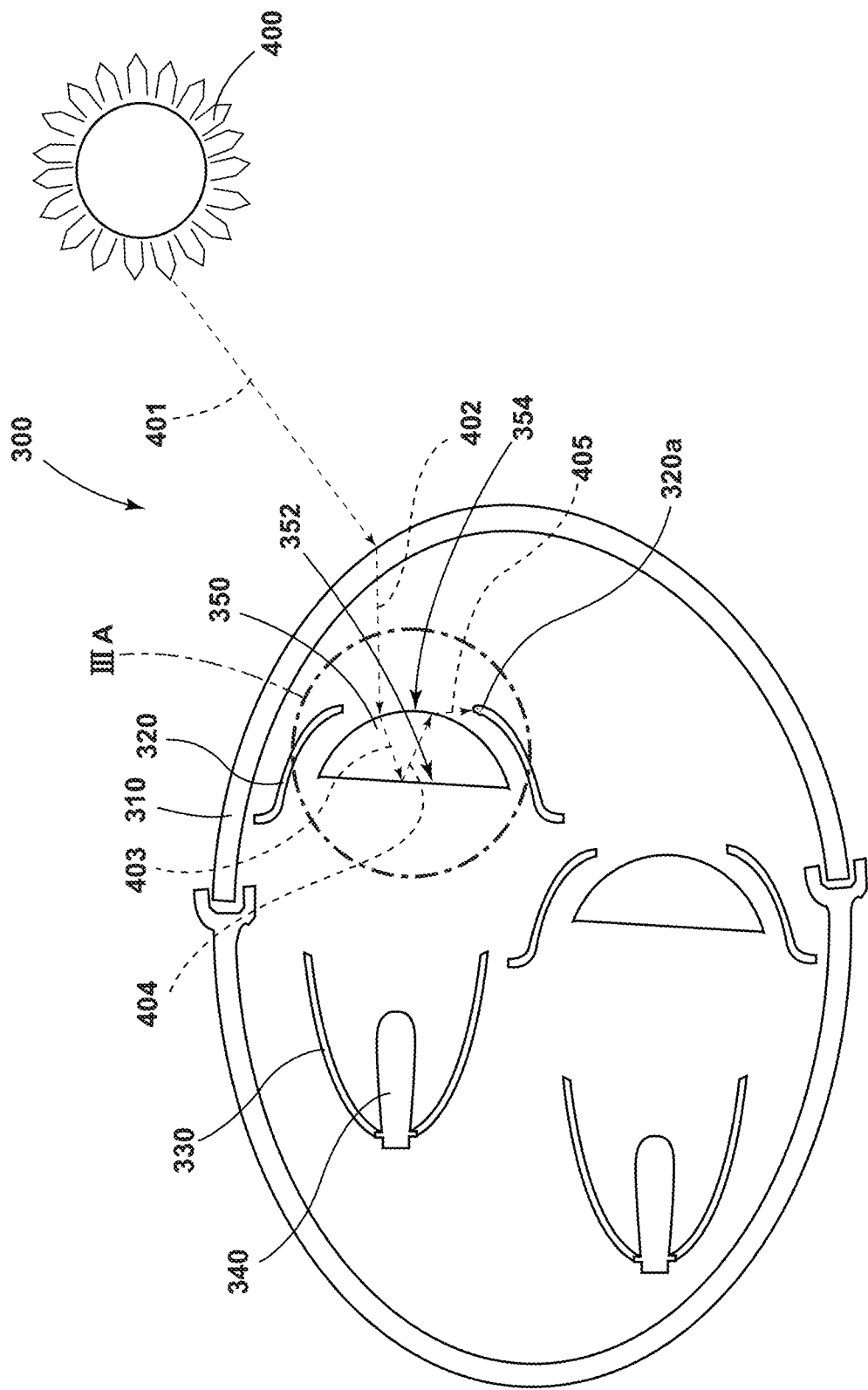
FIG. 3 is a cross-sectional view of a conventional vehicular headlamp assembly susceptible to solar-induced bezel damage.
Figure 3A:
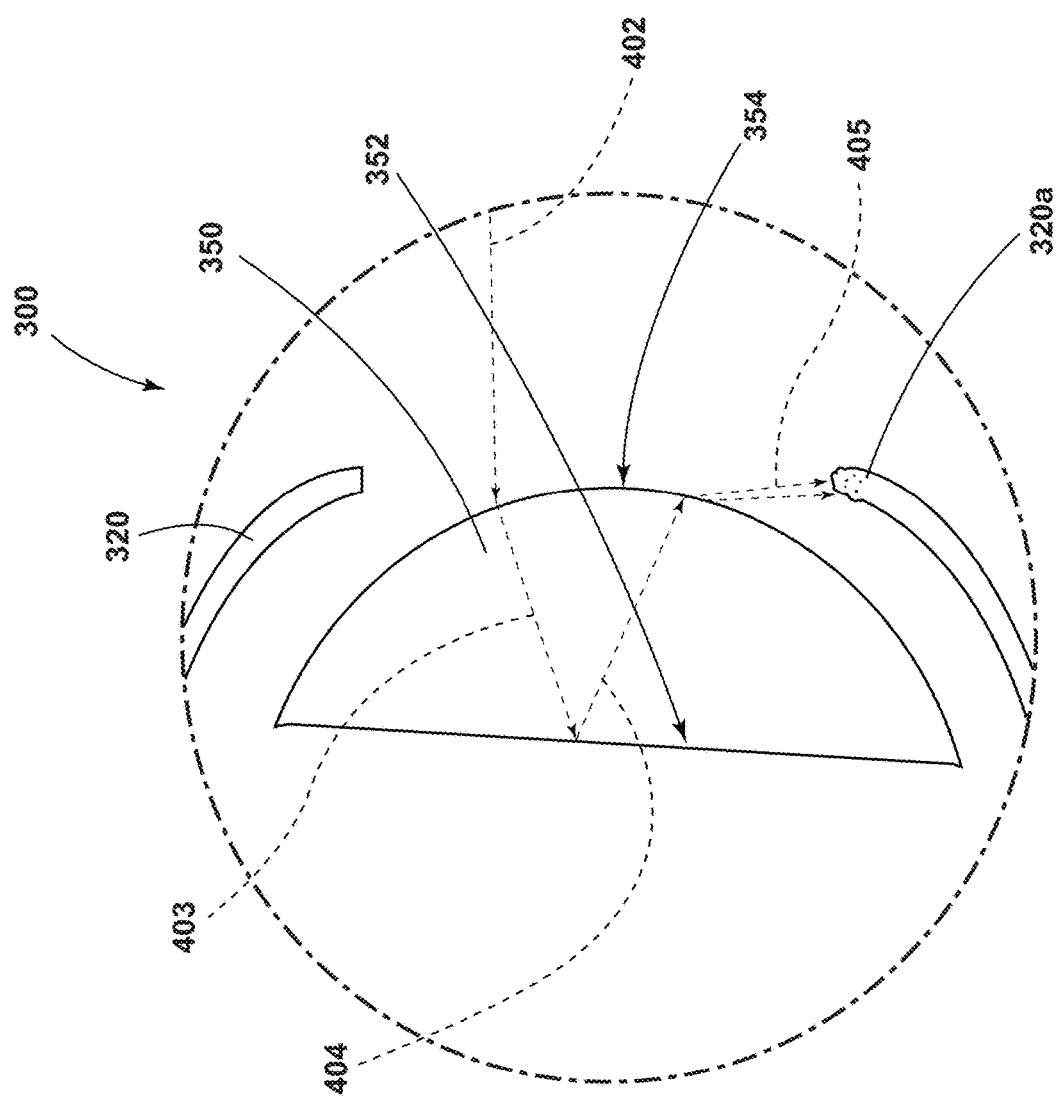
FIG. 3A is an enlarged view of the conventional vehicular headlamp assembly depicted in FIG. 3.
Figure 4:
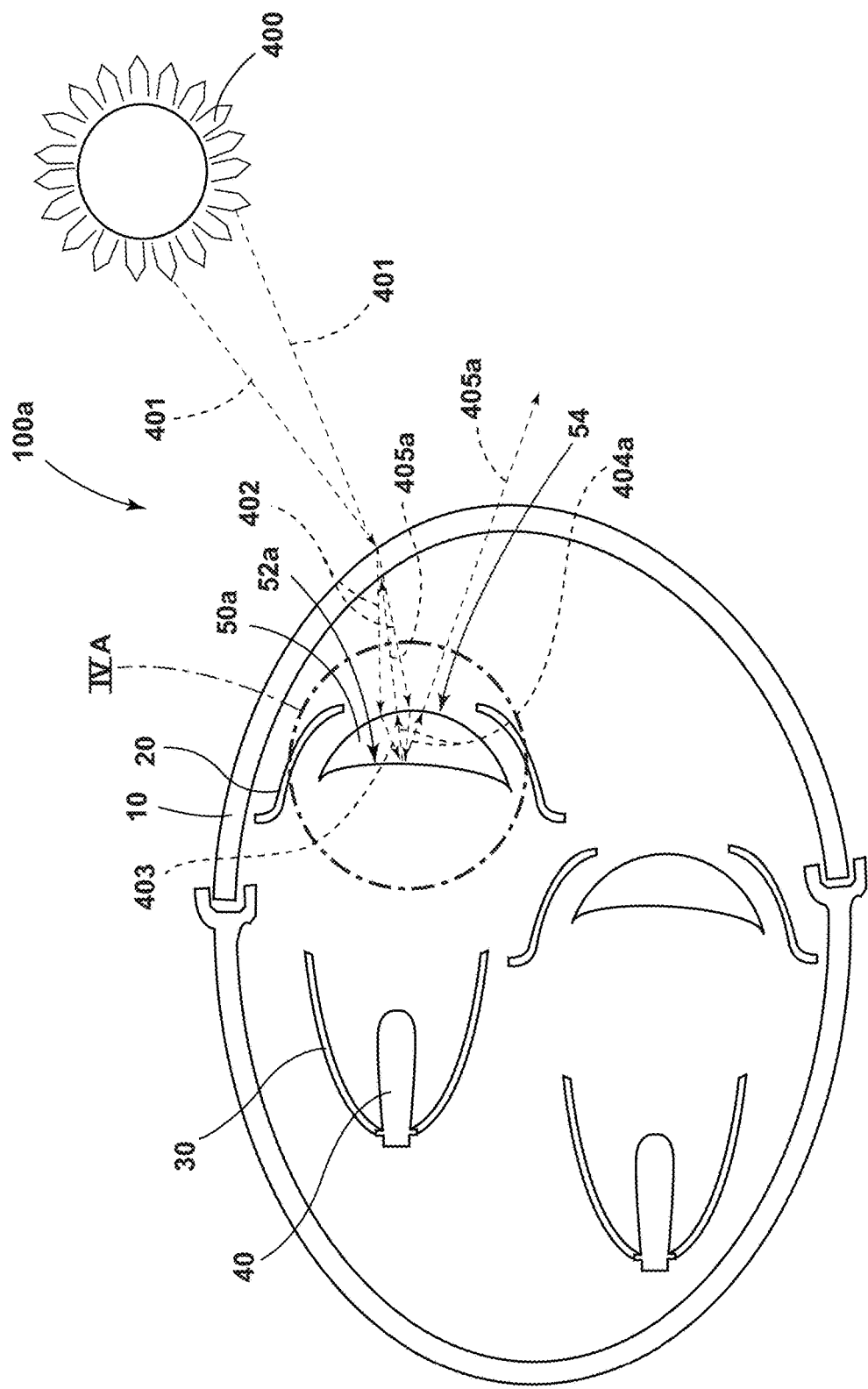
FIG. 4 is a cross-sectional, schematic view of the vehicular headlamp assembly depicted in FIG. 1A through line IIA-IIA, as it refracts ambient light away from its bezel, according to an aspect of the disclosure.
Figure 4A:
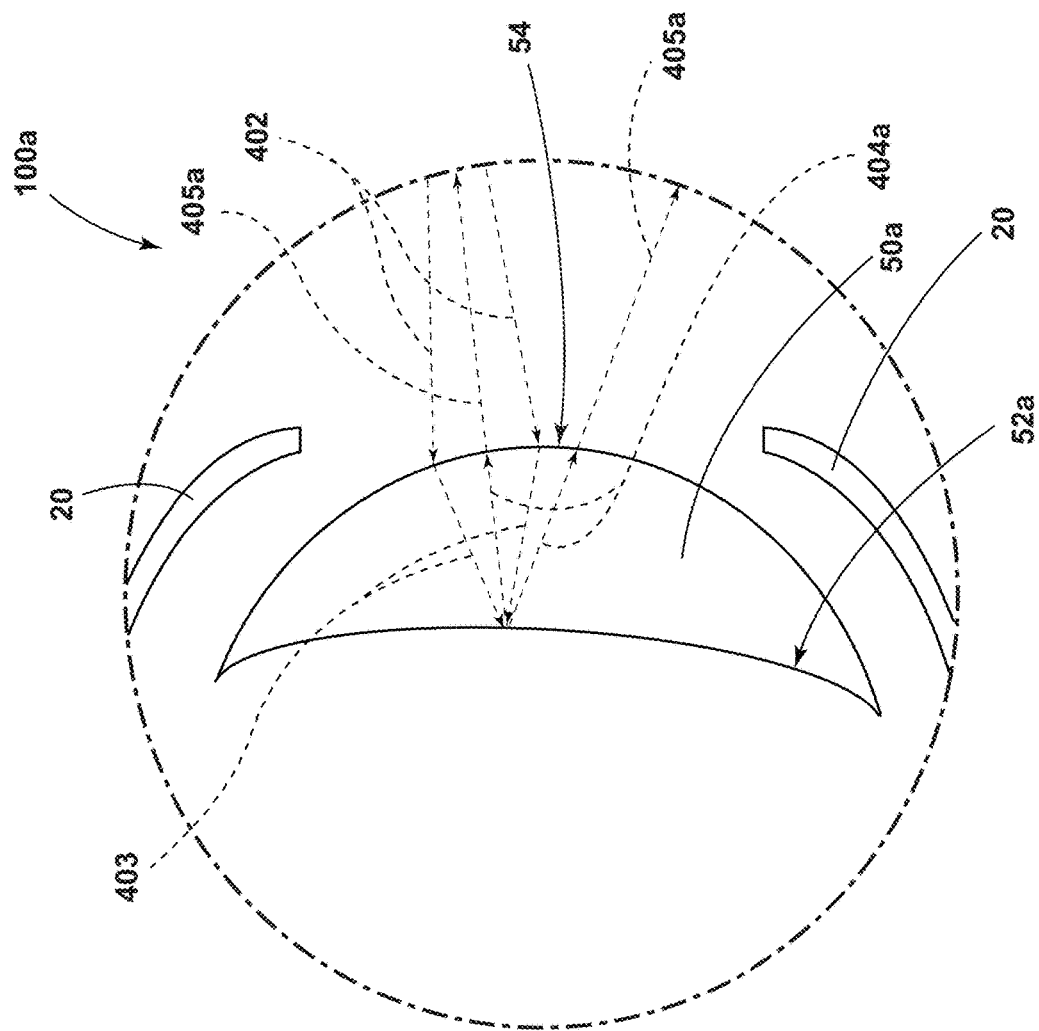
FIG. 4A is an enlarged view of the vehicular headlamp assembly depicted in FIG. 4.
Figure 5:
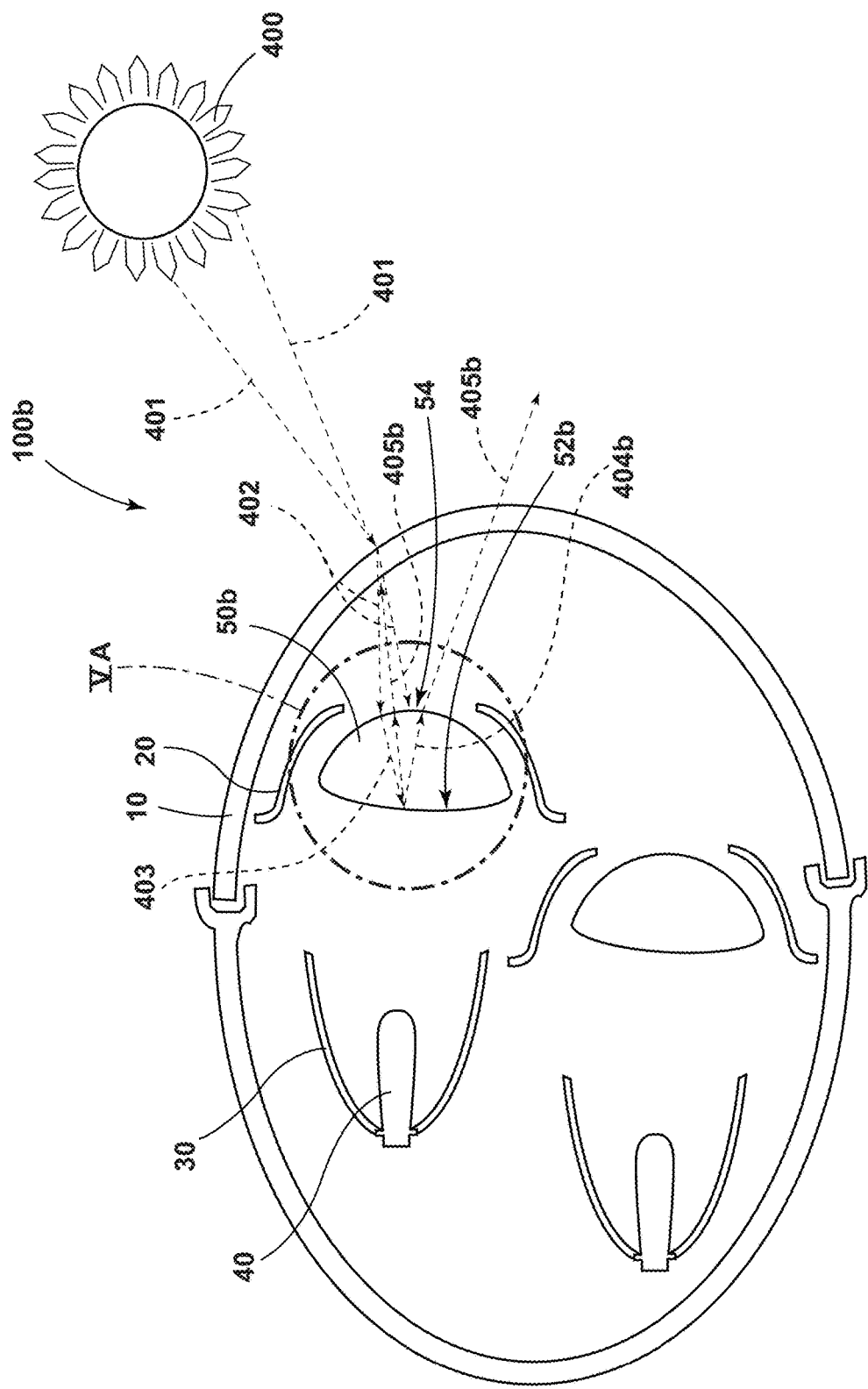
FIG. 5 is a cross-sectional, schematic view of the vehicular headlamp assembly depicted in FIG. 1A through line IIB-IIB, as it refracts ambient light away from its bezel, according to an aspect of the disclosure.
Figure 5A:
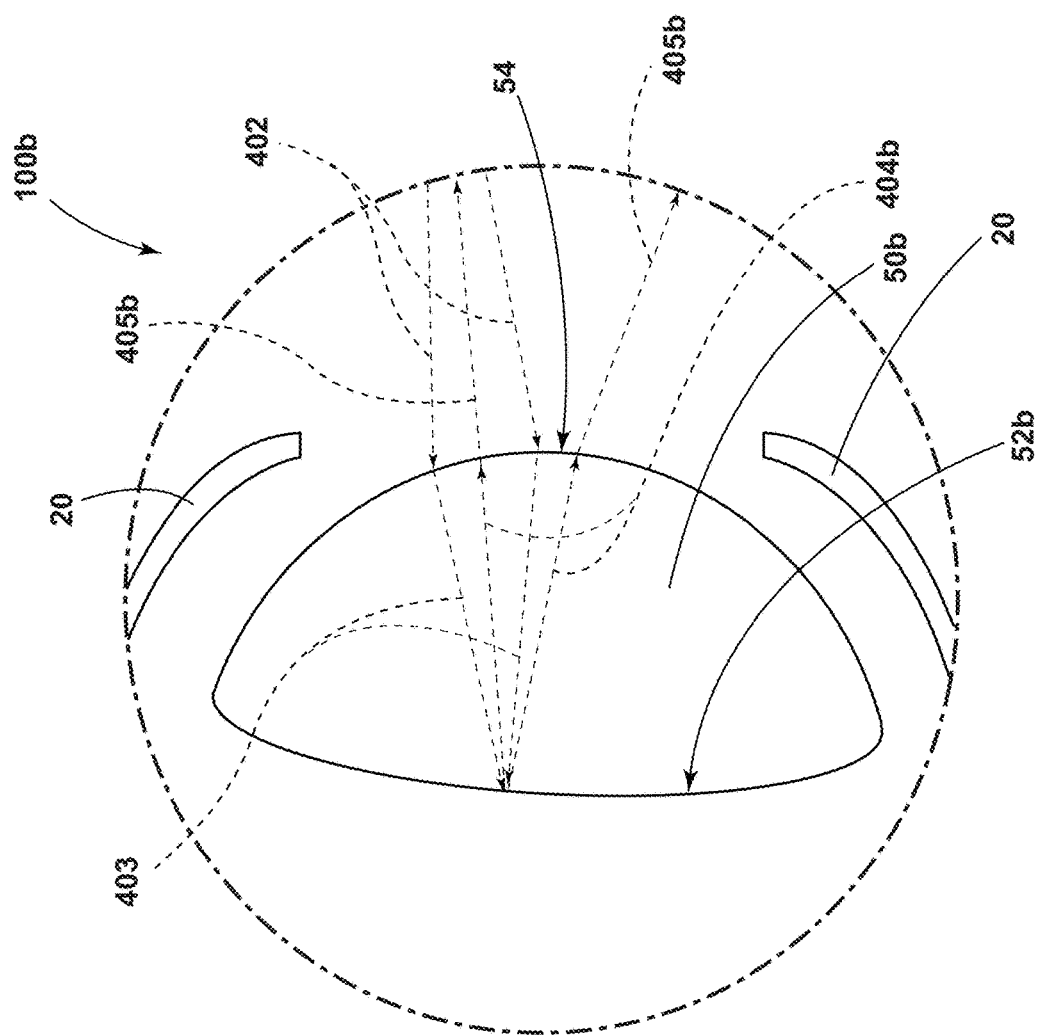
FIG. 5A is an enlarged view of the vehicular headlamp assembly depicted in FIG. 5.

Referring now to FIGS. 3 and 3A, a conventional vehicular headlamp assembly 300 is shown in a cross-sectional, schematic view. The assembly 300 includes a parabolic reflector 330 and a condenser lens 350. The condenser lens 350 includes a planar rear surface 352 and a front surface 354. Further, the headlamp assembly 300 includes an outer lens 310; a bezel 320 between the lenses 310, 350; and a light source 340 that emanates light that strikes the reflector 330 and exits the assembly 300 through the lenses 310, 350.

As also depicted in FIGS. 3 and 3A, the condenser lens 350 of the vehicular headlamp assemblies 300 is configured such that it reflects ambient light entering the condenser lens 350 toward the bezel 320. In particular, sunlight 401 from the sun 400 enters the outer lens 310 of the headlamp assembly 300. The sunlight 401 is then refracted by the lens 310 as refracted light 402, which then enters the condenser lens 350 through its front surface 354. The light 402 is then be refracted by the front surface 354 and continues within the condenser lens 350 as refracted light 403. The refracted light 403 then strikes the rear planar surface 352. The refracted light 403 then reflects directly off of the rear planar surface 352 back toward the front surface 354 of the condenser lens 350. At this point, the reflected light 404 is refracted again by the front surface 354, and exits the condenser lens 350 in the direction of the bezel 320 as refracted light 405. This process tends to result in the refracted light 405 having a high intensity, which can lead to damage to the bezel 320, resulting in a damaged portion 320a. These effects can be exacerbated by the varying angle of the sun relative to the headlamp assembly 300 that occurs throughout the day. It should also be understood that the refracted light 405, in some scenarios, can damage other vehicular components fabricated of materials susceptible to thermal damage, such as fascia comprising one or more polymeric materials, in proximity to the headlamp assembly 350.

As demonstrated by FIGS. 4, 4A, 5 and 5A, the vehicular headlamp assemblies 100a, 100b solve or otherwise mitigate solar damage-related problems associated with conventional headlamp assemblies 350, such as those depicted in FIGS. 3 and 3A. As noted earlier, the condenser lens 50a, 50b of the headlamp assemblies 100a, 100b is configured to ensure that ambient light that enters these assemblies exits them predominantly in directions away from the bezel 20. In particular, sunlight 401 from the sun 400 enters the outer lens 10 of the headlamp assemblies 100a, 100b. The sunlight 401 is then refracted by the outer lens 10 as refracted light 402, which then enters the condenser lens 50a, 50b through its front surface 54. The light 402 is then refracted by the front surface 54 and continues within the condenser lens 50a, 50b as refracted light 403. The refracted light 403 then strikes the rear non-planar surface 52a, 52b configured in respective concave and convex shapes. The refracted light 403 then reflects directly off of the rear non-planar surfaces 52a, 52b toward the front surface 54 of the condenser lens 50a, 50b, and generally away from the bezel 20. At this point, the reflected light 404a, 404b is refracted again by the front surface 54, and exits the condenser lens 50a, 50b away from the bezel 20 as refracted light 405a, 405b. This process tends to result in the refracted light 405a, 405b having a relatively low intensity at any given location, which tends to reduce the intensity of any such light that impacts the bezel 20. Still further, the shape of the non-planar rear surfaces 52a, 52b of the condenser lenses 50a, 50b tends to result in refracted light 405a, 405b that travels away from the bezel 20. Accordingly, the vehicular headlamp assemblies 100a, 100b employ condenser lenses 50a, 50b that are configured to aid in the reduction or complete elimination of solar damage-related phenomena to the bezel 20, fascia and any other vehicular feature in proximity to these assemblies that is susceptible to thermal damage.

Figure 6B:
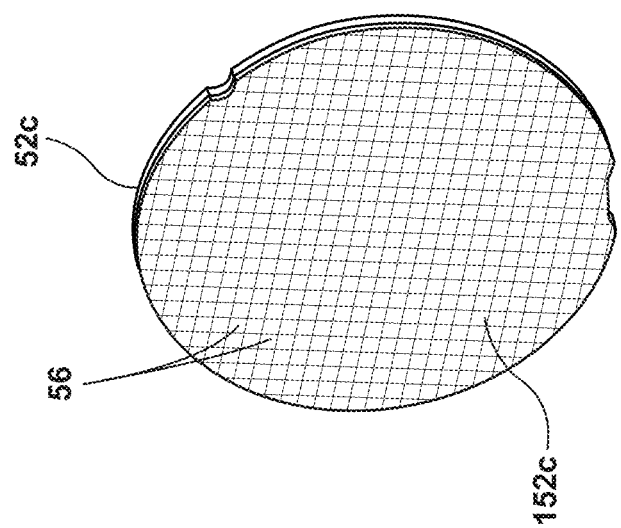
FIG. 6B is an end-on view of the condenser lens depicted in FIG. 6A.
Figure 6A:
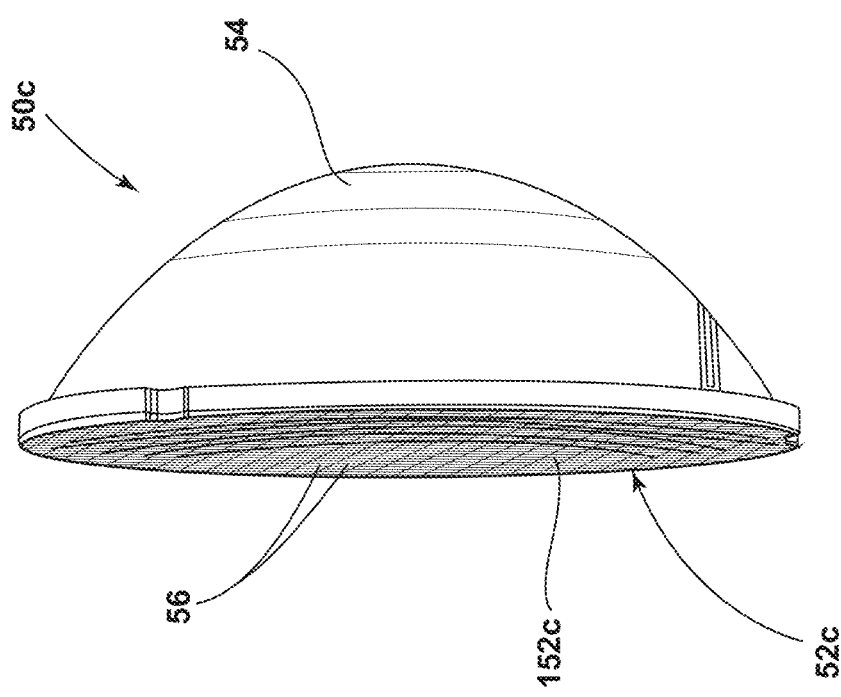
FIG. 6A is a side, perspective view of a condenser lens that can be employed within the vehicular headlamp assemblies of the disclosure, as including a rear surface with a plurality of optical facets, according to a further aspect of the disclosure.

Referring now to FIGS. 6A and 6B, a condenser lens 50c is depicted that can be employed within the vehicular headlamp assemblies 100a, 100b of the disclosure. The condenser lens 50c includes a rear surface 52c with a plurality of optical facets 56. In some aspects, the rear surface 52c is generally planar. In other embodiments, the rear surface 52c of the condenser lens 50c is concave, comparable in shape to the non-planar rear surface 52a of the condenser lens 50a (see, e.g., FIG. 4A). In another embodiment, the rear surface 52c of the condenser lens 50c is convex, comparable in shape to the non-planar rear surface 52b of the condenser lens 50b (see, e.g., FIG. 5A). In embodiments in which the rear surface 52c is concave or convex in shape, a plurality of optical silicone layers 152c can be disposed over the rear surface 52c, with the silicone layers 152c comprising a plurality of optical facets 56 (see FIGS. 6A and 6B). Each of the optical facets 56 can be configured with a convex or concave outer surface. Further, the optical facets 56 can be configured on the non-planar rear surface 52c of condenser lens 50c with a varying density, with our without fillets between each of the facets 56. In addition, the optical facets 56 can be configured with a square, e.g., as shown in FIGS. 6A, 6B, or other shapes including triangular, rectangular, circular and elliptical. More generally, the optical facets 56 are arranged on the rear surface 52c of the condenser lens 50c to spread any ambient light that enters the headlamp assemblies 100a, 100b and strikes the rear surface 52c. As such, these optical facets 56 associated with the condenser lens 50c tend to ensure that ambient light that enters the assemblies 100a, 100b does not exit these assemblies and strike the bezel 20 in a manner which causes solar-related damage.

According to other aspects of the disclosure, the concepts of the foregoing vehicular headlamp assemblies 100a, 100b can be applied to various vehicular lighting assemblies (e.g., low-beam headlamps, high-beam headlamps, turn signals, and parking signals). As readily understood by those with ordinary skill, other vehicular and non-vehicular lighting applications can benefit from the aspects of the disclosure related to avoiding solar-related damage. Various optics can employ the concepts of the disclosure to ensure that ambient light that enters them is refracted, reflected, diffused or otherwise re-directed such that any such ambient light that exits them does not damage components in proximity to the optics.

Variations and modifications can be made to the aforementioned structure without departing from the concepts of the present invention. Such variations and modifications, and other embodiments understood by those with skill in the field within the scope of the disclosure, are intended to be covered by the following claims unless these claims by their language expressly state otherwise.

What is claimed is:

1. A vehicular lighting assembly, comprising:
 a condenser lens comprising a non-planar rear surface;
 an outer lens;
 a reflector;
 a bezel between the lenses; and
 a light source that emanates light that strikes the reflector and exits the assembly through the lenses,
 wherein the non-planar rear surface comprises quantum dots configured to emit light from an excitation emission in the infrared spectrum and is configured to reflect ambient light entering the condenser lens away from the bezel, and
 further wherein the quantum dots comprise $LaF_3$ quantum dot nanocrystals that are doped with one or more of Yb-Er, Yb-H and Yb-Tm.

2. The assembly according to claim 1, wherein the non-planar rear surface comprises a plurality of optical facets.

3. The assembly according to claim 2, wherein each of the optical facets comprises a convex rear surface.

4. The assembly according to claim 2, wherein each of the optical facets comprises a concave rear surface.

5. The assembly according to claim 1, wherein the condenser lens further comprises an optical silicone layer over the non-planar rear surface.

6. The assembly according to claim 1, wherein the excitation emission is between about 800 nm and 1000 nm.

7. A vehicular lighting assembly, comprising:
 a condenser lens comprising a non-planar rear surface;
 an outer lens;
 a reflector;
 a bezel between the lenses; and
 a light source that emanates light that strikes the reflector and exits the assembly through the lenses, wherein the non-planar rear surface comprises quantum dots having a radius of between about 1 nm and about 10 nm and reflects ambient light entering the condenser lens away from the bezel, and further wherein the quantum dots comprise $LaF_3$ quantum dot nanocrystals that are doped with one or more of Yb-Er, Yb-H and Yb-Tm.

8. The assembly according to claim 7, wherein the non-planar rear surface comprises a plurality of optical facets.

9. The assembly according to claim 8, wherein each of the optical facets comprises a convex rear surface.

10. The assembly according to claim 8, wherein each of the optical facets comprises a concave rear surface.

11. The assembly according to claim 7, wherein the condenser lens further comprises an optical silicone layer over the non-planar rear surface.

12. The assembly according to claim 7, wherein the condenser lens further comprises a plurality of optical silicone layers over the non-planar rear surface, the silicone layers comprising a plurality of optical facets.

13. The assembly according to claim 7, the non-planar rear surface comprises quantum dots having a radius of between about 2 nm and about 6 nm.

14. A vehicular lighting assembly, comprising:
a condenser lens comprising a non-planar rear surface having a crown angle from 1 to 5 degrees;
an outer lens;
a reflector;
a bezel between the lenses; and
a light source that emanates light that strikes the reflector and exits the assembly through the lenses,
wherein the non-planar rear surface comprises photoluminescent quantum dots and reflects ambient light entering the condenser lens away from the bezel, and
further wherein the quantum dots comprise $LaF_3$ quantum dot nanocrystals that are doped with one or more of Yb-Er, Yb-H and Yb-Tm.

15. The assembly according to claim 14, wherein the non-planar rear surface comprises a plurality of optical facets.

16. The assembly according to claim 15, wherein each of the optical facets comprises a convex rear surface.

17. The assembly according to claim 15, wherein each of the optical facets comprises a concave rear surface.

18. The assembly according to claim 14, wherein the condenser lens further comprises an optical silicone layer over the non-planar rear surface.

19. The assembly according to claim 14, wherein the condenser lens further comprises a plurality of optical silicone layers over the non-planar rear surface, the silicone layers comprising a plurality of optical facets.

20. The assembly according to claim 14, wherein the quantum dots comprise $LaF_3$ quantum dot nanocrystals.

* * * * *